United States Patent
Odemann

(10) Patent No.: US 7,496,587 B2
(45) Date of Patent: Feb. 24, 2009

(54) METHOD FOR THE MANAGEMENT OF AERONAUTICAL INDUSTRY IMPLEMENTS TO BE CHECKED

(75) Inventor: Christian Odemann, Basel (CH)

(73) Assignee: EDOMAT (Deutschland) Treuhand- und Vermögensverwaltungsgesellschaft mbH, Winsen/Luhe (DE)

( * ) Notice: Subject to any disclaimer, the term of this patent is extended or adjusted under 35 U.S.C. 154(b) by 291 days.

(21) Appl. No.: 10/869,205

(22) Filed: Jun. 16, 2004

(65) Prior Publication Data

US 2004/0236755 A1 Nov. 25, 2004

Related U.S. Application Data

(63) Continuation of application No. 09/591,097, filed on Jun. 8, 2000, now abandoned.

(30) Foreign Application Priority Data

May 5, 2000 (EP) .................................. 00109574

(51) Int. Cl.
*G06F 17/00* (2006.01)
*G06F 12/00* (2006.01)
*G01C 23/00* (2006.01)

(52) U.S. Cl. ........................... 707/101; 707/1; 707/200; 701/3

(58) Field of Classification Search ................ 707/1, 707/100–102, 104.1, 200–201; 701/29, 30; 709/318
See application file for complete search history.

(56) References Cited

U.S. PATENT DOCUMENTS

| | | | | |
|---|---|---|---|---|
| 4,843,640 A | * | 6/1989 | Juengel | 398/109 |
| 4,890,111 A | * | 12/1989 | Nicolet et al. | 340/10.34 |
| 5,144,314 A | * | 9/1992 | Malmberg et al. | 342/44 |
| 5,517,194 A | * | 5/1996 | Carroll et al. | 340/10.34 |
| 5,541,574 A | * | 7/1996 | Lowe et al. | 340/447 |
| 5,745,049 A | * | 4/1998 | Akiyama et al. | 340/870.17 |
| 5,931,877 A | * | 8/1999 | Smith et al. | 701/29 |
| 6,070,240 A | * | 5/2000 | Xydis | 726/17 |
| 6,112,152 A | * | 8/2000 | Tuttle | 701/115 |
| 6,115,656 A | * | 9/2000 | Sudolsky | 701/35 |
| 6,225,898 B1 | * | 5/2001 | Kamiya et al. | 340/505 |
| 6,297,727 B1 | * | 10/2001 | Nelson, Jr. | 340/10.1 |
| 6,366,742 B1 | * | 4/2002 | Reihl et al. | 399/12 |
| 6,724,895 B1 | * | 4/2004 | Turner et al. | 713/168 |
| 7,042,346 B2 | * | 5/2006 | Paulsen | 340/438 |
| 7,104,438 B2 | * | 9/2006 | Benedict | 235/375 |
| 2002/0015066 A1 | * | 2/2002 | Siwinski et al. | 347/19 |
| 2003/0019941 A1 | * | 1/2003 | Altwasser et al. | 235/492 |

* cited by examiner

*Primary Examiner*—Miranda Le
(74) *Attorney, Agent, or Firm*—Friedrich Kueffner

(57) ABSTRACT

According to the invention, expensive and technical high-quality implements (11a, 11b) of the aeronautical industry which, for certain checks of the airplanes, must be overhauled and/or new calibrated or certified, are provided with a radio frequency transponder (RFT and/or bar code) with or without cryptography (15a, 15b) which contains an individual machine readable identification characteristic of the implement (11a, 11b). The status data of each implement are stored at the manufacturer's under this identification characteristic in a central data bank (13) and can be remote called with a corresponding authorization. Thus, it is possible to carry out the sending of the implements without accompanying documents and to optimize the logistic allotment.

1 Claim, 1 Drawing Sheet

METHOD FOR THE MANAGEMENT OF AERONAUTICAL INDUSTRY IMPLEMENTS TO BE CHECKED

CROSS-REFERENCE TO RELATED APPLICATIONS

This application is a continuation application of U.S. application Ser. No. 09/591,097 filed Jun 8, 2000 now abandoned.

The invention relates to a method for the management of aeronautical industry implements which have to be sent to special workshops for checking, maintenance, calibration, certification, repair or the like.

BACKGROUND OF THE INVENTION

In the so-called "After Sales" field of the aeronautical industry there are many expensive high-quality implements, especially special tools and spare parts which must be sent to the manufacturer or to special workshops for checking, maintenance, overhaul work, calibration, certification, repair or the like. These implements can be so-called line replacement units (LRU) or maintenance replacement units (MRU) which are mounted in an airplane and which must be overhauled for C- or D-checks of the airplanes. There can also be equipment stationed on the ground such as so-called ground support equipment (GSE) which is required to assist the work to be carried out for C- or D-checks or in other cases of need. This equipment is provided already during the production with machine-readable individual identification characteristics in order to achieve optimization potentials already by delivery to the airplane assembly. After use, this equipment has to be sent back for calibration or for a new certification to the manufacturer or to a special repair shop certified by the manufacturer or by the end user. This sending of equipment requires management and control as well as the holding of the necessary accompanying documents (certificates) so that there results an important expenditure of logistic which, in addition to this, is susceptible to errors to a great extent.

Before this background, the aim of the invention is to make available a method for the management of said implements of the aeronautical industry which is advantageous, more efficient and safer.

SUMMARY OF THE INVENTION

Accordingly, the method serves the management of implements of the aeronautical industry which must be sent to special workshops for checking, maintenance, calibration, certification, repair or the like. It is characterized in that the implements are provided with an individual machine readable identification characteristic, that the status data of the implements are stored in a central data bank and that a remote access to the data bank is possible. Through these measures, the expenditure of management for the sending of implements can be considerably reduced and automatized to a great extent. This saves time and costs and simultaneously leads to a reduced susceptibility to errors.

The allocation of a definite individual identification characteristic to each implement and the use of a data bank in which the characteristic and the corresponding status data of the implements are stored, gives at any time comprehensive and complete information about these implements which, in addition to this, can be submitted to remote inquiry. Thus, this information is available everywhere and independently from the temporary staying place of the implement. The preparation of the accompanying documents can thus be saved to a great extent or completely since all the necessary information can be called at any time in the data bank. The machine readability of the identification characteristic is responsible for the fact that the method can be automated and that the characteristic can be detected quickly and efficiently with an appropriate reading device.

In particular, the present place of stay of the implement, the usual place of use of the implement, the certification status including the corresponding documents, the calibration status, the age of the implement and/or future checking dates of the implements belong to the status data which are memorized in the data bank. The status data of an implement can also be linked with those of other associated implements. With such data, the user can get a complete idea of the state of maintenance of the implement at any time and from any place. Preferably, the identification characteristic of the implement is simultaneously used for the access to the data of this implement which are memorized in the data bank. This guarantees that the memorized data cannot be used without authorization and that no abuse is possible with the data. The type of the machine readability of the identification characteristic can also be configured in such a way that the identification characteristic can only be detected with a special reading device which communicates the identification characteristic in case of an access to the data bank in an encoded form (password).

The data about these implements which are memorized in the data bank are preferably used to optimize the logistic guidance of the allotment of the implements. Thus, for example the sending of several various implements from an user to the producer or from a producer to the user can be combined if it is stated on the basis of the data bank that the sending or the sending back of theses implements is due approximately at the same date. Moreover, the assignment of the implements to different users can be improved if the producer has a general survey over the existing number of implements ready to use at the different users. In this case, the implement of an user who is sufficiently equipped can also, if need be, be sent to another user who is urgently dependent on this implement. In this way, the need for the user to hold extensive spare part stockrooms of important implements is eliminated or reduced.

The individual identification characteristic of an implement is preferably made available by a radio frequency transporter (RFT) or by a radio frequency transponder RFT with cryptography. A transponder answers to an inquiry in a given or programmed-in manner. Such an implement has the advantage that it is flexible concerning the memorized identification characteristics, that a reading-out of the identification characteristics from a limited spatial distance is possible without direct contact with the implement and that the identification characteristic is protected against unauthorized access. In particular, the reading out of the identification characteristic from the RFT can presuppose the entry of an owner's code.

Thus, the invention also relates to the use of a radio frequency transponder for carrying out a method of the above mentioned type.

BRIEF DESCRIPTION OF THE DRAWINGS

An embodiment of the invention will be explained in detail below with reference to the drawing in FIG. 1.

DETAILED DESCRIPTION OF THE PREFERRED EMBODIMENT

Figure 1:
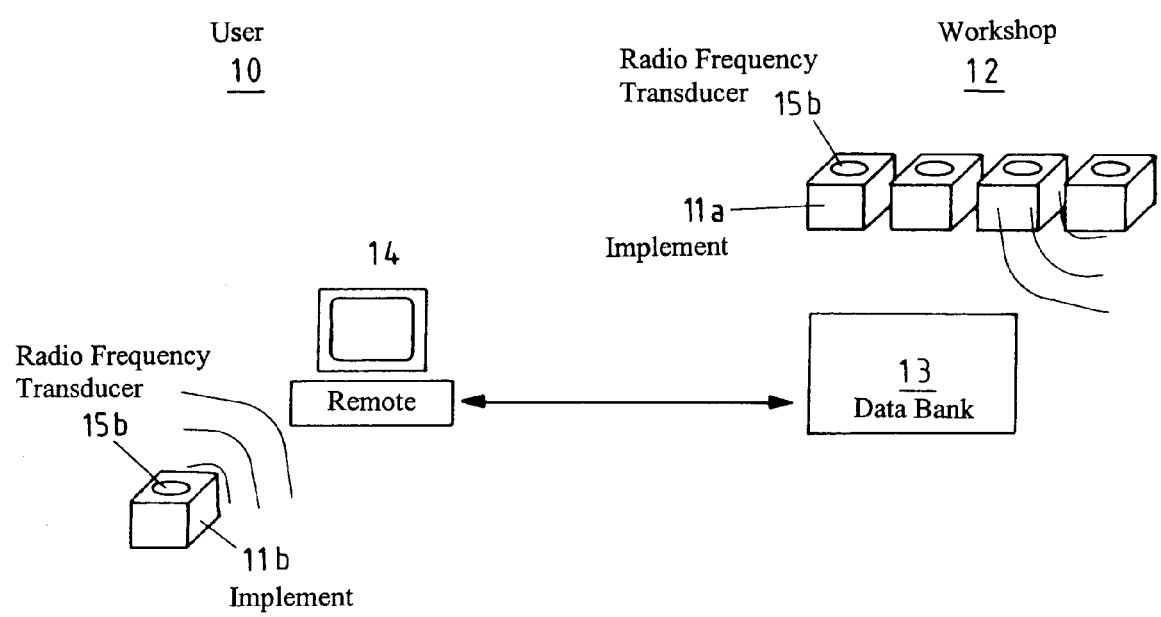

The only FIG. 1) schematically shows the process of management of implements in the field of the aeronautical industry which must be sent by the user 10 to a special workshop 12, for example to the manufacturer of the implement, for maintenance, calibration, certification or the like. The implements 11a, 11b are equipped according to the invention with a radio frequency transponder (RFT and/or bar code) 15a, 15b which can be read all around the world by means of a reading device. The RFT is provided with an unequivocal and unique number and, in addition to this, can store different information. The passive RFT can only be read by means of an owner's code in order to comply with the conditions prevailing in the aeronautical industry.

The most important status data of the implements 11a, 11b are stored in a data bank 13 under the number memorized in the RFT. The data bank 13 is preferably maintained by the manufacturer 12 of the implement however, its place is basically any. The data bank is originally fed by the manufacturer and later extended or updated by the users of the implement as well as updated by repair or overhauling processes or certifications. The data bank is operated by a maintenance service.

The data bank 13 can then be remote interrogated 14, which can ensue for example over appropriate nets such as the internet. An access to the data bank is thus possible almost all around the world. By means of the corresponding reading device, an authorized user can remote inquiry from the data bank the certificates or the other information stored therein. In this way, the sending of the implements 11a, 11b can principally be carried out without any documents which reduces the expenditure and the costs and which simultaneously leads to a reduced susceptibility to errors. Moreover, the part flow can be controlled over the central computer with the data bank 13, and its economical efficiency can be optimized. An advantage of the invention thus consists in the improved tracing and tracking as well as in the revealing of control circuits which can be optimized by the RFT use. Furthermore, a quicker part flow can be achieved, and the investment in the spare part field can be reduced. Not least the stop times of the airplanes for the checks can thus be reduced.

The invention claimed is:

1. A method for management of aeronautical industry implements which have to be sent to special workshops for checking, maintenance, calibration, certification and repair, comprising the steps of:
   providing the implements with an individual, machine readable identification characteristic;
   electronically storing the implement status data and the characteristic in a central data bank separate from the implements and available to authorized persons at remote locations via a network a reading device;
   permitting a remote access to the data bank while excluding paper or electronic accompanying documents containing information concerning the implements by sending of the implements;
   making the individual identification characteristic available by a radio frequency transponder, the identification characteristic of an implement serving as proof of authorization for permitting the access to data stored in the data bank, wherein the status data includes: present location, place of use, certification status, calibration status, age and future checking dates, the radio frequency transponder having an unequivocal and unique number, whereby the passive radio frequency transponder is only readable using a proprietary code in order to comply with conditions prevailing in the aeronautical industry, whereby the most important of the status data of the implements is originally stored in a central processor in the data bank under the number stored in the radio frequency transponder, the data bank being originally fed by the manufacturer and later updated or extended by users of the implement as well as updated by repair or overhauling processes or certifications;
   managing the implements by accessing the status data in the central data bank to determine the status of an implement; and
   optimizing logistic guidance of an allotment of the implements by means of the data of the data bank.

* * * * *